UNITED STATES PATENT OFFICE.

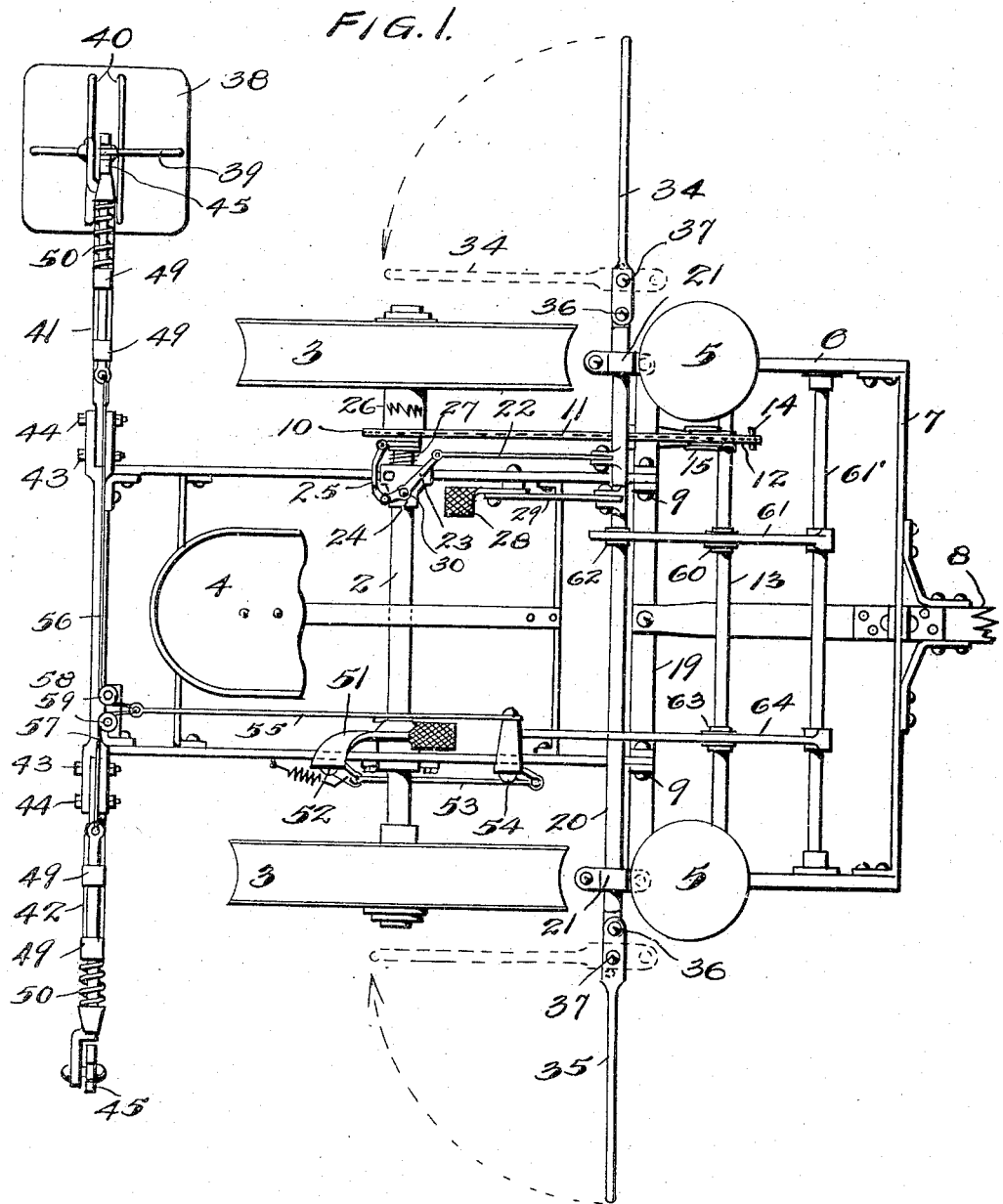

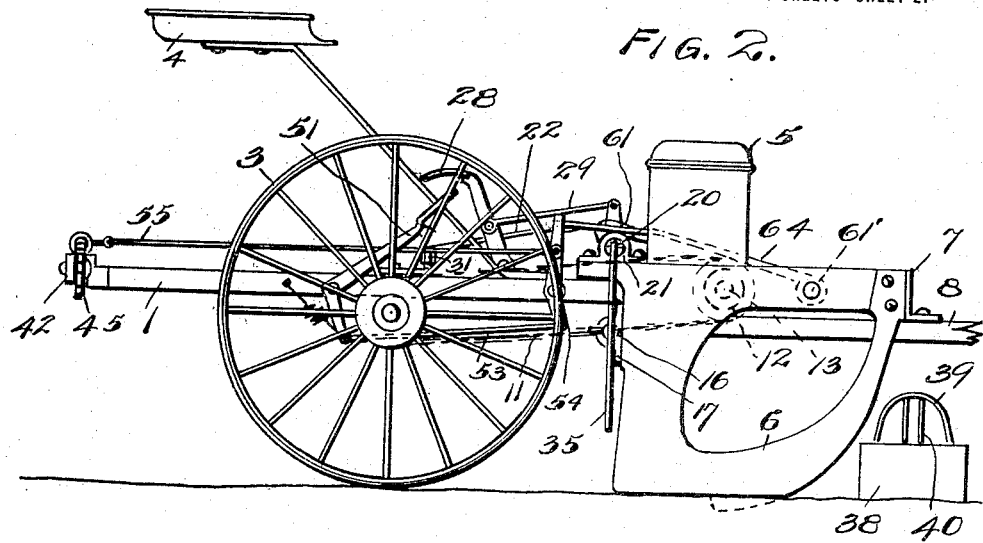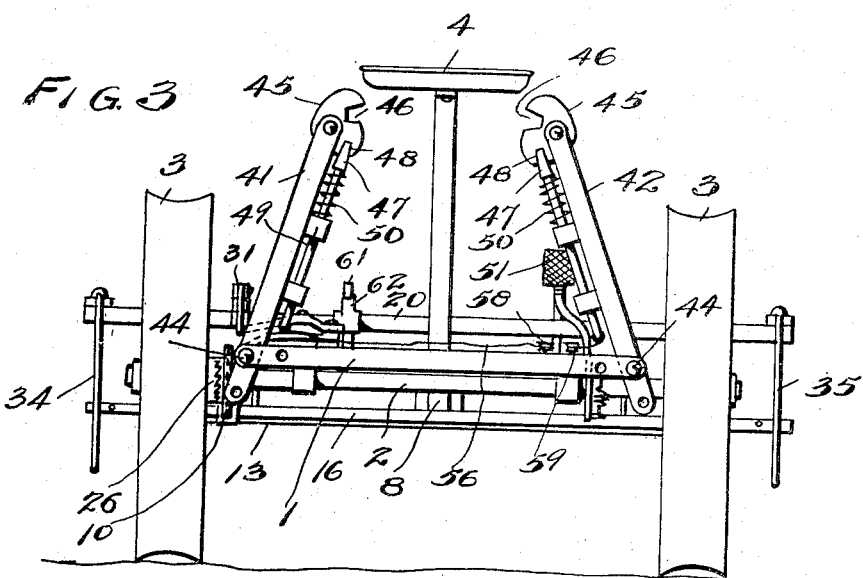

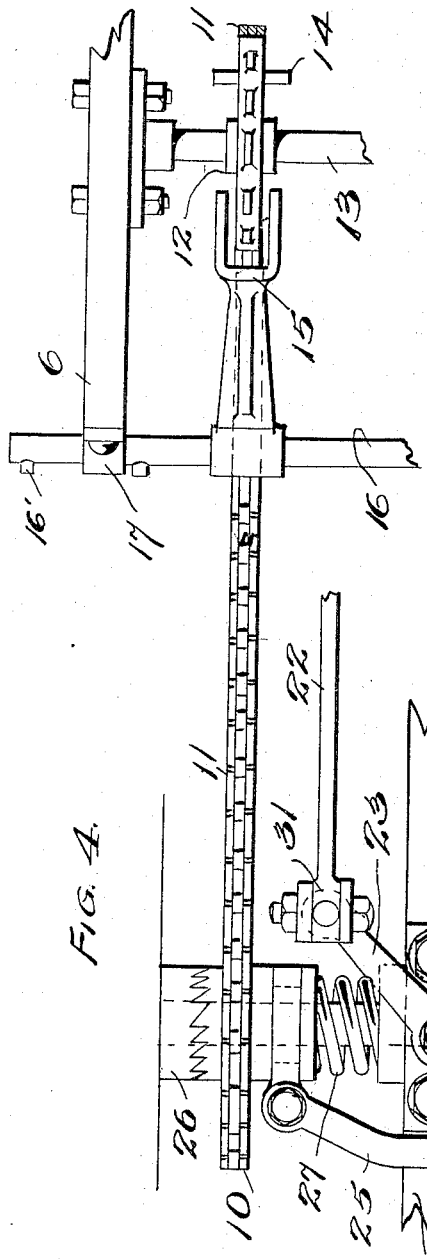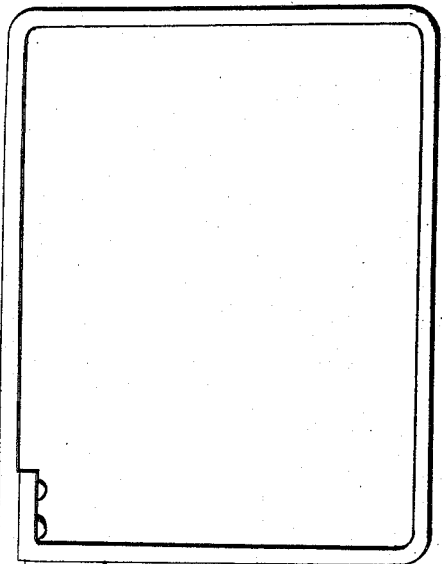

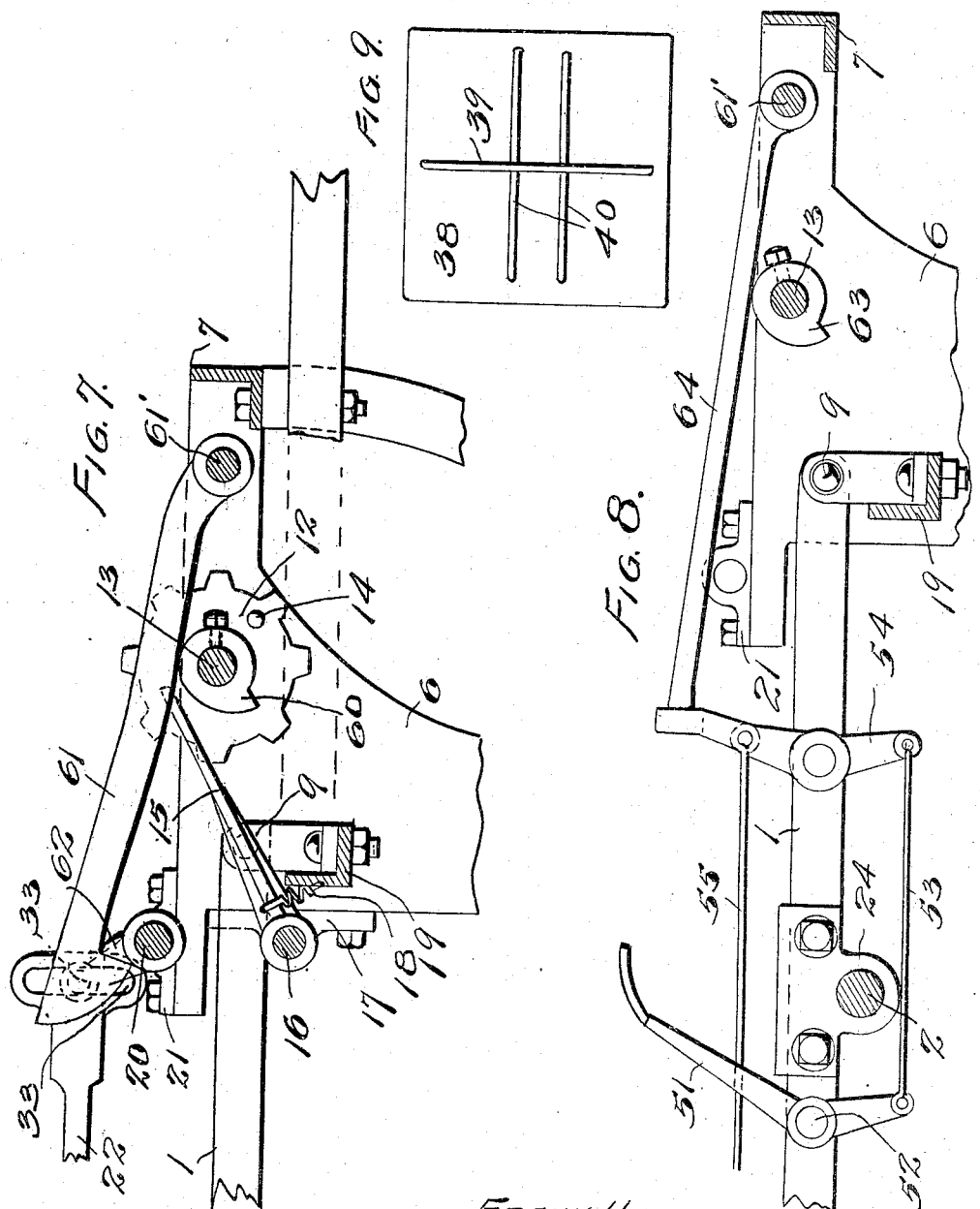

FRANK HEVEL, GROVER CLEVELAND HARRINGTON, AND WILLIAM HEVEL, OF McCUNE, KANSAS.

CORN-PLANTER.

1,206,705.     Specification of Letters Patent.     Patented Nov. 28, 1916.

Application filed August 14, 1916. Serial No. 114,835.

*To all whom it may concern:*

Be it known that we, FRANK HEVEL, GROVER C. HARRINGTON, and WILLIAM HEVEL, citizens of the United States of America, residing at McCune, in the county of Crawford and State of Kansas, have invented a new and useful Improvement in Corn-Planters, of which the following is a specification.

Our invention relates to improvements in corn planters and is designed to simplify the construction and operation of implements of this character in several particulars, and especially in providing an efficient and reliable guide to check a succeeding hill in line with the preceding hill planted, before the implement is turned around at the end of a row. And the invention consists in certain novel combinations and arrangements of parts including a dispensable weight or block carried by the implements and adapted to be dropped back of the hill of corn near the end of the row, before the implement is turned around, and then certain mechanism forming part of the implement is adapted to contact with and be actuated by said contact to throw the mechanism of the planter in gear to operate to drop the succeeding hills of corn.

In the accompanying drawings we have illustrated one complete example of the physical embodiment of our invention constructed according to the best mode we have so far devised for the practical application of the principles of our invention.

Figure 1 is a top plan view of an implement embodying our invention. Fig. 2 is a side elevation of the implement. Fig. 3 is a rear view of the implement with some of its operating parts folded to inoperative position, for road travel. Fig. 4 is an enlarged plan view of the clutch mechanism and connected parts, and the planting device. Fig. 5 is a view in elevation of Fig. 4 as seen from the left. Fig. 6 is a view in elevation of one of the wings or actuating members adapted to contact with an obstruction on the ground for the purpose of throwing the clutch mechanism into gear. Fig. 7 is a sectional view of a portion of the implement showing the dropping mechanism, and the means for holding the front frame member in uplifted position. Fig. 8 is a sectional view showing the weight dropping mechanism. Fig. 9 is a top plan view of the weight.

In the preferred embodiment of our invention we employ the usual or standard type of corn planter comprising the main frame 1, the driving axle 2 and the traction wheels 3, 3. The driver occupies the seat 4, and the hoppers are indicated at 5, 5, and co-act with the runners 6 to plant the corn as usual. The hoppers are carried by a supplemental frame 7 at the front of the implement to which the tongue 8 is attached, and the supplemental frame is pivoted to the main frame at 9, 9, so that planting of corn may be accomplished to best advantage.

The planting is accomplished through the means of the sprocket wheel 10 on the driving shaft 2, the sprocket chain 11, and the front sprocket wheel 12 on the counter shaft 13 journaled in the front frame 7. The sprocket 12 is provided with a pair of oppositely projecting pins 14, 14, which revolve with the sprocket and are adapted to contact with and bear upwardly against the end of a forked arm 15 which is fixed on the rock shaft 16 located between the main driving shaft or axle and the countershaft and journaled in brackets 17, 17 at the rear of the shoes or runners 6, 6. A spring 18 attached to the forked arm and to the bar 19 of the front frame tends to hold the forked arm down, and returns it to normal position after the pins 14 have passed from under the ends of the forked arm. By this means the rock-shaft is actuated to drop the corn through suitable feed mechanism not illustrated.

Located just above the rock-shaft 16, a rock bar 20 is adapted to rock or oscillate in throwing the machine into or out of gear. This rock bar is journaled in brackets 21, 21 and is parallel with the driving shaft, although supported in the front frame 7. Through the medium of the link 22, pivoted lever 23 on the bearing bracket 24 of the axle, and the draw link 25, the clutch 26 is disengaged to throw the machine out of gear, or into inoperative position. The clutch 26 is held closed by means of the spring 27, and it may be opened or disengaged by bearing down upon the pedal 28 pivoted on the frame 1 and pivotally connected by the draw link 29 to the rock bar 20. Thus when pressure is brought to bear upon the pedal or foot lever 28, the rock bar 20 is turned anticlockwise to swing the lever 23 on its pivot 30 until the swivel joint 31 between link 22 and lever 23 has passed to the left in Fig. 4 until the swivel joint is "off center". In this position the draw link 25 has pulled the sprocket portion of the clutch free from the wheel portion and is held in that position until the pivot point 32 between the lever 23 and draw link 25 is swung to the left past the point 30. The swivel joint 31 at one end of the link 22, and the slotted connection 33 at the other end of this link where it is pivoted to the rock bar at 33' permit free movement of the front frame.

The reverse movement of the pedal 28 will of course throw the machine into gear, but in addition to this mechanism we employ automatically operated mechanism for this purpose. At each end of the rock bar 20, an extension or wing as 34, and 35, is attached, each wing being provided with two bolts 36 and 37, the latter being a pivot bolt and the former a retaining or locking bolt. When both bolts are in position the wings or extensions 34, 35 are held in fixed alinement beyond the ends of the rock bar, but it will readily be seen that after the bolt 36 is removed the extension may be swung to the rear or folded in as shown in dotted lines Fig. 1, and in this position are inoperative. These wings or extensions are designed to hang, one at each side of the implement, between rows, and contact with an obstruction or block 38 which is automatically dropped at a predetermined point. This block may be of concrete or other material and has embedded therein and projecting therefrom diametrically arranged metal bars or wires 39 and 40 against which the wings or extensions are designed to contact and rock the rock shaft to throw the clutch in and begin dropping seed from the hoppers.

Only one of the blocks or obstructions or abutments is required, but it may be carried from either side of the implement and is to be dropped alternately from each side, at the ends of the rows. In Fig. 1 the block is suspended at the left side of the implement and is supported in a pivoted arm 41, a duplicate arm 42 being pivoted at the opposite side of the frame 1. These arms are parallel with the driving shaft and may be folded, vertically, as in Fig. 3 when not in use. Each arm is attached to the frame by means of two bolts 43 and 44, the latter a pivot bolt and the former a retaining bolt, so that when both bolts are in position the arms are held in rigid relationship with the frame 1. Each arm is provided at its extreme outer end with a pivoted hook 45 which is recessed or notched at 46 to receive the bail 39 of the block 38 and support the block by its bail. The hook 45 is held fixed by a latch bolt 47 which engages the notch 48 in the hook and is slidable in the two bearings 49, 49 on the pivoted arm, while the coiled spring 50 between the head of the latch bolt and one of the bearings 49 holds the latch bolt closed. The block may be released and permitted to drop to the ground by means of the foot pedal 51 pivoted at 52 on the main frame 1, and this foot lever is pivotally connected by a link 53 to a forwardly pivoted lever 54 which is in turn connected by the draw rod 55 to the pull cords or cables 56 and 57 which pass around pulleys 58 and 59 at the rear of the frame 1, and then are attached to the inner ends of the latch bolts.

To throw the planter out of gear, the eccentric 60 on counter shaft 13 must first release the hooked arm 61 on pivot bar 61' from the lug 62 on the rock bar 20, and this is accomplished when the foot lever 28 is pressed down so that the revolving eccentric will lift the hooked arm just as the planter is ready to drop a hill of corn, or just as the pin 14 strikes the fork 15 to lift it and rock the rock shaft. By pressing upon the foot lever 51 with the eccentric 63 on shaft 13 revolving, the eccentric lifts the arm 64 to release the lever 54 causing the latch bolts to be withdrawn and permitting the block 38 to fall to the ground. Hook 61 by passing over and engaging lug 62 holds the rock shaft 20 so that the planter cannot be thrown out of gear until eccentric 60 on shaft 13 releases the hook, which action takes place just as the planter is ready to drop a hill. The weight cannot be dropped until the cam 63 raises arm 64, and the lever 51 may then be actuated to drop the weight. The cams 60 and 63 of course lift their elements 61 and 64 every three feet eight inches as the fork 15 rocks the shaft 16 to actuate the planter to drop a hill.

The block 38 is dropped as the planter drops a hill of corn at a point approximately 3' 8" back from the hill of corn planted near the end of the row, and the block is left in line with the hill of corn at the end and to the side of the row, thus giving room for the team and planter to turn around at the end of the row, and the dropped weight or block is located midway between the last row planted and the next row to be planted. As the implement is started back across the field, one of the wings or extensions will ride over the bail 39 of the block 38 and rock the bar 20 to throw the clutch into gear and start the planting operation, a hill being dropped in the ground just as the extension runs over the bail of the block. After the implement has been thrown into gear, the driver steps off the implement, recovers the block, and hangs it on the opposite side of the implement where it will serve to throw the machine into gear after it has been thrown out at the other end of the field prior to turning.

What we claim is:

1. The combination in a seed planter with its driving mechanism and feed actuating mechanism, means for throwing the feed mechanism out of gear, and means carried by the planter adapted to contact with an abutment for throwing the feed mechanism into gear as the implement travels forward.

2. The combination with the wheels, supporting frame, driving mechanism, and feed actuating mechanism, of a rock bar having end extensions projecting at the sides of the frame adapted to contact with an abutment, and connections from said rock bar to the driving mechanism for operatively connecting the driving mechanism and feed mechanism.

3. The combination in a seed planter with its driving mechanism and feed mechanism, of a transversely arranged rock bar having foldable end wings projecting from its ends beyond the wheels and adapted to contact with an abutment on the ground, and connections between said rock bar and the driving mechanism for operatively connecting the driving mechanism with the feed mechanism.

4. The combination in a seed planter having projecting contact members at the sides of the planter, of means at the rear of said members for supporting a detachable block, and means for detaching said block to have it fall in line with one of said contact members.

5. The combination with a seed planter and its frame of a supporting arm and a pivoted suspension member thereon, means for holding said member to retain an abutment member, and means for releasing the suspension member to drop said abutment member.

6. The combination with a seed planter and its frame of a foldable supporting arm and a pivoted hook thereon, a latch bolt for retaining said hook to suspend an abutment member, and means for releasing the latch bolt to drop the abutment member.

7. The combination with a seed planter and its frame of a supporting arm and a pivoted hook thereon, means for holding the hook to retain an abutment member, and means carried by the planter operatively connected to the hook and operated by said abutment member to release the hook.

8. The combination with a seed planter including its driving mechanism, feed mechanism, and frame, of a supporting arm and a hook thereon for suspending an abutment member, a spring pressed latch bolt for holding the hook to suspend an abutment member, and means for releasing said bolt to drop the abutment member.

In testimony whereof we affix our signatures.

FRANK HEVEL.
GROVER CLEVELAND HARRINGTON.
WILLIAM HEVEL.

Copies of this patent may be obtained for five cents each, by addressing the "Commissioner of Patents, Washington, D. C."